United States Patent [19]

Ernst et al.

[11] Patent Number: 5,042,999

[45] Date of Patent: Aug. 27, 1991

[54] AIR INTAKE FILTER FOR INTERNAL COMBUSTION ENGINES

[75] Inventors: Volker Ernst, Sachsenheim; Arthur Klotz, Remseck; Rudolf Leipelt, Marbach, all of Fed. Rep. of Germany

[73] Assignee: Filterwerk Mann & Hummel GmbH, Ludwigsburg, Fed. Rep. of Germany

[21] Appl. No.: 533,141

[22] Filed: Jun. 6, 1990

[30] Foreign Application Priority Data

Jun. 6, 1989 [DE] Fed. Rep. of Germany ....... 3918347

[51] Int. Cl.[5] ............ B01D 35/02

[52] U.S. Cl. ............ 55/482; 55/459.1; 55/502; 55/503

[58] Field of Search ............ 55/315, 323, 337, 419, 55/482, 459.1, 493, 502, 503, 510, 509, 507, 418, DIG. 28

[56] References Cited

U.S. PATENT DOCUMENTS

| | | | |
|---|---|---|---|
| 1,875,427 | 9/1932 | Donaldson | 55/315 |
| 3,048,959 | 8/1962 | Lowther | 55/459.1 X |
| 3,319,404 | 5/1967 | Lowther | 55/337 X |
| 3,385,034 | 5/1968 | Farr | 55/493 X |
| 3,423,909 | 1/1969 | Bennett et al. | 55/510 X |
| 3,429,108 | 2/1969 | Larson | 55/510 X |
| 3,442,067 | 5/1969 | Swenson | 55/482 |
| 3,508,383 | 4/1970 | Humbert et al. | 55/337 |
| 3,672,130 | 6/1972 | Sullivan et al. | 55/509 X |
| 4,006,000 | 2/1977 | Tortorici et al. | 55/323 |
| 4,197,101 | 4/1980 | Cote, Jr. et al. | 55/419 |

FOREIGN PATENT DOCUMENTS

| | | |
|---|---|---|
| 1665873 | 10/1953 | Fed. Rep. of Germany . |
| 2418341 | 9/1979 | France . |
| 60-8469(A) | 1/1985 | Japan . |

*Primary Examiner*—Richard L. Chiesa
*Attorney, Agent, or Firm*—Foley & Lardner

[57] ABSTRACT

An air intake filter containing a filter insert within a canister. The canister includes a raw air inlet and an opening for the introduction of the filter insert, the filter insert having a sealing surface parallel to the plane of the opening to seal the clean-air side. This sealing surface is applied to another sealing surface on an adapter with a sealing ring interposed therebetween, and the canister is fastened to the adapter. To prevent any shearing movement on the sealing ring when the canister is attached to the adapter, a guide is provided on the adapter and is engaged by a sliding shoe disposed on the canister. Furthermore, a spacer is situated on the canister and assures that the canister cannot be laid against the adapter unless the two sealing surfaces are correctly positioned with respect to one another.

13 Claims, 3 Drawing Sheets

AIR INTAKE FILTER FOR INTERNAL COMBUSTION ENGINES

BACKGROUND OF THE INVENTION

The present invention relates to an air intake filter for an internal combustion engine comprising a filter insert disposed in a canister which has a raw air inlet and an opening for the introduction of the filter insert, the filter insert having a sealing surface parallel to the plane of the opening, an adapter having a sealing surface arranged opposite the sealing surface on the filter insert, a gasket interposed between the two sealing surfaces, and means for fastening the canister to the adapter.

U.S. Pat. No. 4,006,000 discloses an air filter for air intake filtration, comprising a substantially cylindrical canister having a raw air inlet disposed tangentially on the canister plus a filter insert through which the air flows radially. The canister itself can be connected by means of a bayonet coupling to a cylindrically shaped air intake manifold. In this air intake manifold there is a safety cartridge which is intended to prevent dirt and dust from entering the air intake when the filter insert is replaced. When the bayonet coupling is locked, a seal is created between the safety cartridge and the filter insert by shifting the filter insert axially toward the safety cartridge such that the end face of the filter insert contacts the end face of the safety cartridge. This axial shift is performed with an adjusting screw disposed on the front wall of the canister, which imparts an axial movement to the end plate of the filter insert. One disadvantage of this known system is that there must be a very large amount of free space around the canister for insertion and removal of the filter insert. First, in order to release the bayonet lock, a certain amount of axial movement must be possible. Second, the necessary turning of the adjusting screw for the axial displacement of the filter insert is possible only if there is sufficient space in the vicinity of this adjusting screw to operate it manually. This air intake filter construction is therefore not suitable where space is at a premium.

SUMMARY OF THE INVENTION

It is the object of the invention to provide an air intake filter for internal combustion engines which will permit easy replacement of the filter.

Another object of the invention is to provide an air intake filter for internal combustion engines which does not require a large amount of free space around it for installation and/or adjustment.

These and other objects of the invention are achieved by providing an air intake filter for an internal combustion engine comprising a filter insert; a canister for receiving the filter insert, the canister having a raw air inlet and an opening for introducing the filter insert into the canister, the filter insert having a first sealing surface parallel to a plane defined by the opening when the filter insert is received in the canister; an adapter having a second sealing surface; means for fastening the canister to the adapter, the second sealing surface being arranged opposite the first sealing surface when the canister containing the filter insert is fastened to the adapter; and a sealing element interposed between the first sealing surface and the second sealing surface; wherein at least one guide is provided on the adapter and at least one sliding shoe is arranged on the canister, the guide and the sliding shoe cooperating with each other to facilitate proper positioning of the canister on the adapter, and wherein at least one spacer is provided on the canister which extends toward the adapter and engages against an abutting surface on the adapter to hold the first and second sealing surfaces apart when they are incorrectly positioned with respect to one another, and a recess is provided on the adapter for receiving each spacer when the first and second sealing surfaces are correctly positioned with respect to one another, thereby permitting the first and second sealing surfaces to be sealed against one another by the sealing element.

An important advantage of this invention is that the canister does not need to be moved axially during installation and removal. In order to attach the canister to a corresponding adapter, the canister is introduced downwardly in a direction substantially parallel to the sealing surface on the adapter. To prevent any shearing movement from acting on the gasket the canister is tilted away from the adapter at a slight angle from the axially aligned position. It is tilted until a position is reached in which the gasket and the sealing surface face one another concentrically. In this position the canister can be rocked up and then clamped against the adapter. It has been found that this type of installation calls for very little additional free space around the canister and thus promotes a compact and space-saving design in internal combustion engines.

In accordance with a preferred embodiment of the invention, the canister is pot-shaped and the raw air flows radially through a filter cartridge. The filter cartridge has on its annular end plate facing the adapter a gasket in the form of a ring. This annular end plate can also be provided with baffles to form an axial cyclone which improves the separation of dust.

Two guides are provided on the adapter for guiding the canister movement necessary for installation and removal. The canister has two shoes which, when the canister is introduced into the area where it is to be connected to the adapter, are guided by the guides to bring the canister to the correct position. The guides are configured such that the shoes in the correct position provide a precisely defined fulcrum for the canister, so that it will be impossible for the canister to slip or shift when it is properly joined to the adapter.

In an especially advantageous embodiment of the invention, two spacers are provided on the canister. These two spacers are arranged outside the sealing area of the canister and serve to steady the movement of the canister as it is moved into the attached position. If the distance between the spacers and the shoes is made as large as possible, there is no danger of any incorrect tilting. The canister is therefore positively guided in all directions when it is installed or removed, so that it is impossible to attach the canister incorrectly to the adapter or to damage the gasket.

In a further preferred embodiment of the invention a handle is provided on the canister for easier handling. As a visible aid to positioning the canister, this handle may be provided with a centering projection to be inserted between centering surfaces on the adapter.

In still another embodiment, a safety cartridge is disposed in the adapter. This safety cartridge prevents dust or dirt from entering into the clean air area when the filter cartridge is changed. The end plate of the safety cartridge advantageously forms the sealing surface which is sealingly engaged by the gasket of the filter cartridge.

When the canister is in position after the filter cartridge has been changed, the canister must be fastened to the adapter. This is accomplished by supporting the shoes on the guide so that they thus simultaneously serve as holding means. It is therefore sufficient to provide one or two catches on the side opposite the shoes so that three or four holding means are formed on the periphery of the canister.

German Gebrauchsmuster No. DE-G 16 65 873, for example, discloses a hook catch in conjunction with a lug. In this arrangement, however, there is a danger that the parts to be joined together might be fastened askew so that the fastening means are no longer precisely in line with one another. This, however, impairs the operation of these joining means.

BRIEF DESCRIPTION OF THE DRAWINGS

The invention will be explained in further detail below with reference to preferred embodiments illustrated in the accompanying drawings, in which.

DETAILED DESCRIPTION OF PREFERRED EMBODIMENTS

Figure 1:
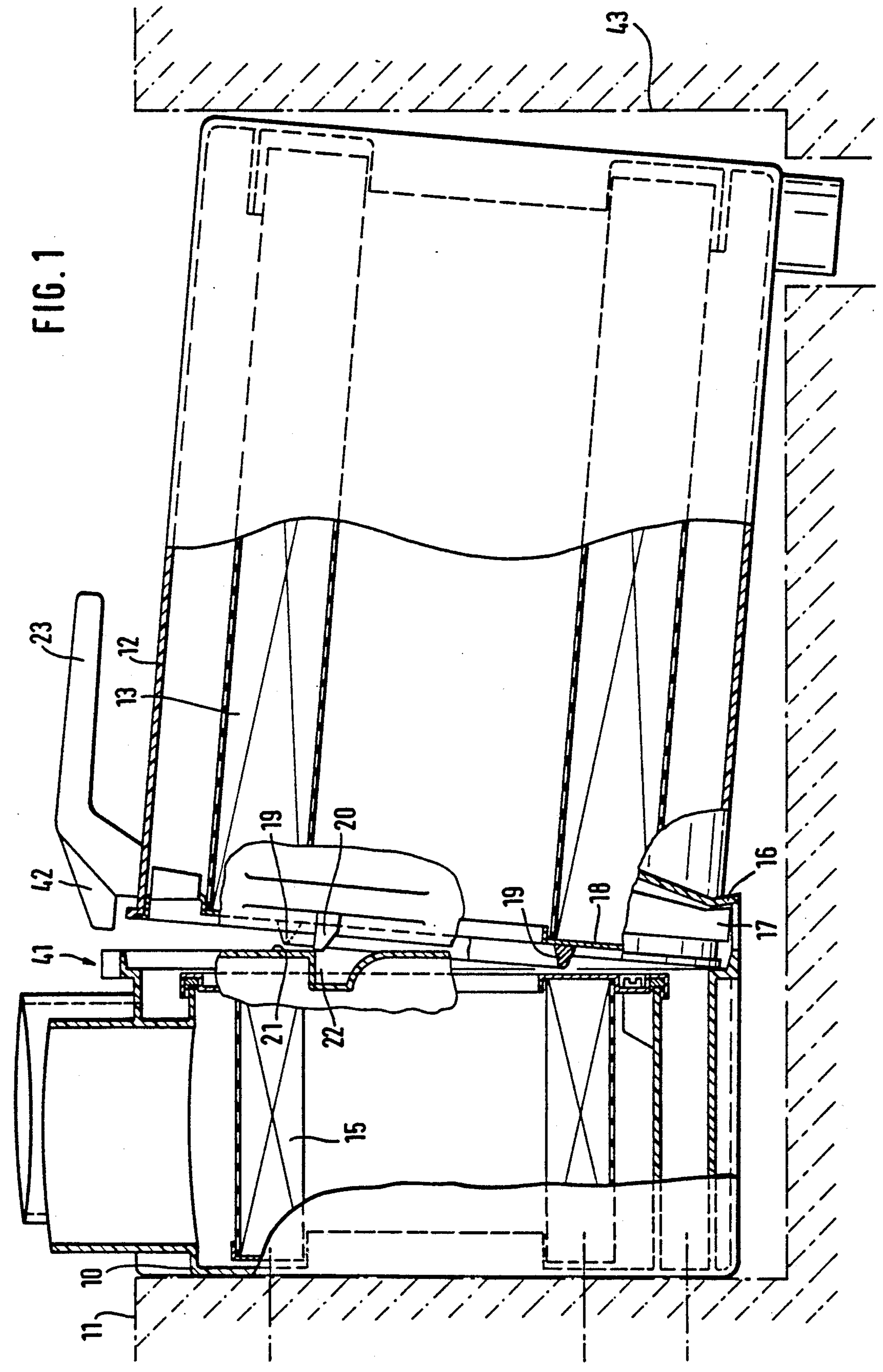
FIG. 1 is a diagrammatic representation of an air intake filter in the process of being installed.

The air intake filter in FIG. 1 comprises two basic elements. An adapter 10 is fixedly disposed on a mounting wall 11. The canister 12, into which a replaceable filter cartridge 13 can be inserted, can be affixed to this adapter 10. A certain limited amount of space available for the entire air intake filter is defined by the broken line 43. Within the adapter 10 is a safety cartridge 15. This safety cartridge prevents the entry of dust into the air intake side when the filter cartridge 13 is replaced. Both the adapter 10 and the canister 12 are pot-shaped, i.e., substantially cylindrical with one closed end.

The parts described hereinafter, which facilitate and secure the attachment of the canister 12 to the adapter 10, are disposed radially outward of the outside diameter of the canister and therefore do not interfere with the airways provided within the canister. A first guiding and fastening means for the canister 12 comprises a guide 16. This guide 16 is funnel-shaped and is directly joined to the adapter 10. The adapter 10 is preferably an injection molded plastic part which includes the guide. The canister 12, which is likewise an injection molded plastic part, is provided with a shoe 17. When the canister 12 is inserted into the wall 11 on which it is to be mounted, this shoe initially serves in conjunction with the guide 16 to limit the movement of the canister 12 and then to determine the end position, i.e., the final position in which the canister 12 can be fastened. This shoe also serves as a fastening means, i.e., the shoe serves to secure the canister 12 axially in the installed state.

Between the confronting ends of the filter cartridge 13 and the safety cartridge 15 a seal is to be provided. This seal is provided by an annular gasket 19 disposed on the end plate 18 of the filter cartridge 13. When the canister 12 is inserted against the adapter 10, there is a danger that this gasket 19 will rub along the safety cartridge or along the end faces of walls of the adapter 10, and that the shear forces will damage or destroy the gasket 19. Furthermore, when the sealing pressure is applied, the gasket itself and the sealing surface will shift laterally with respect to each other, producing abrasion. This too can damage the gasket or pull it away from the filter insert.

To prevent the gasket 19 from contacting any other parts while the installation is in progress, the canister 12 comprises at least one spacer in the form of a projection 20. This projection engages against an abutting surface 21 on the adapter and thus holds the canister 12 away from the adapter 10. Not until the canister 12 is in its correct position, i.e., in the installed position, can the two parts be assembled together. This is achieved by providing a recess 22 on the adapter 10 on which the canister is to be mounted, into which recess the projection 20 enters, thereby permitting the sealing surfaces to meet.

A handle 23 is provided for manipulating the canister 12. In the vicinity of this handle there are two latches which fasten the canister 12 to the adapter 10.

Figure 2:
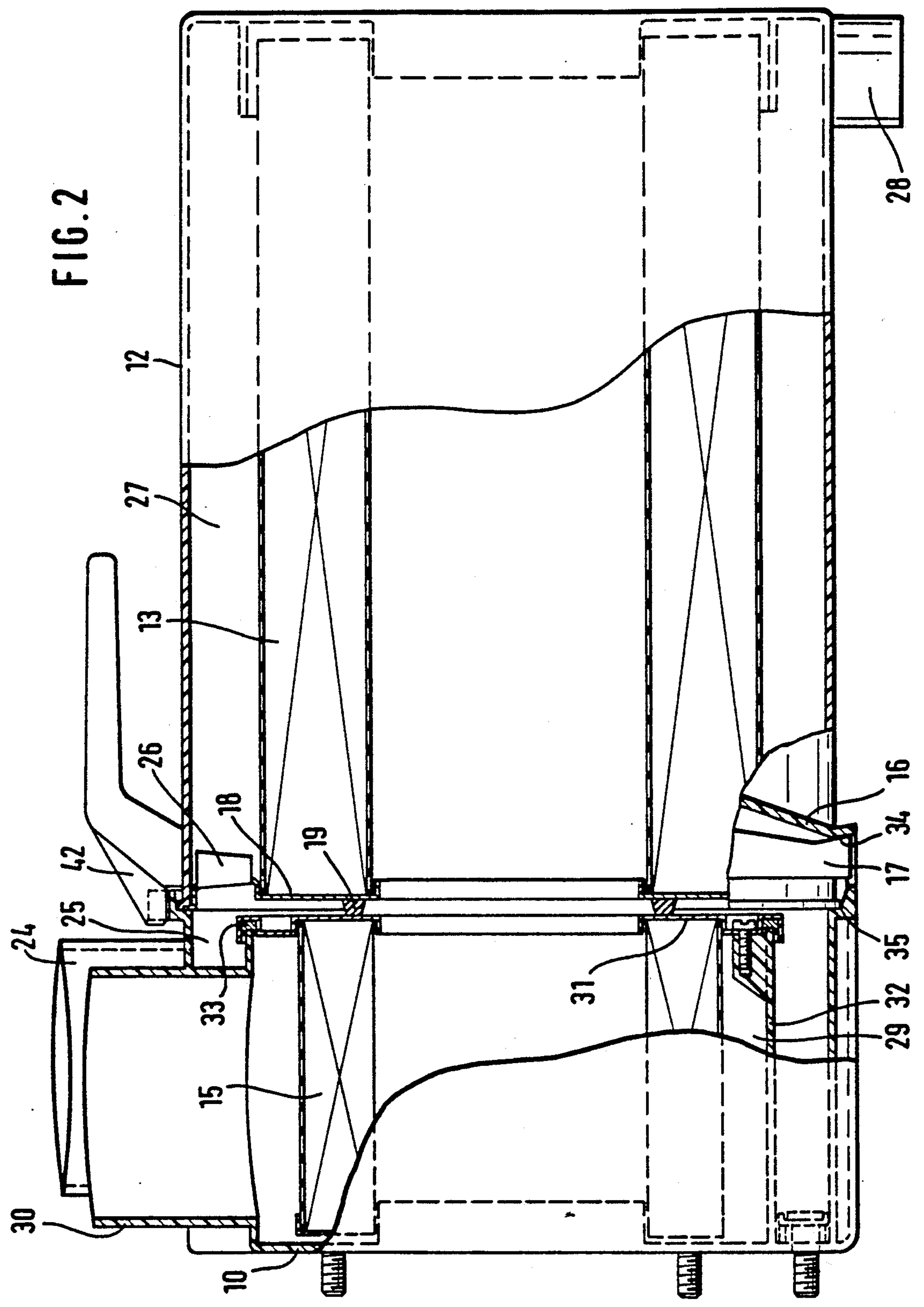
FIG. 2 is a view of the air intake filter of FIG. 1 in the fully installed position.

FIG. 2 is a detailed representation of the entire air intake filter. In this drawing the canister 12 is shown in the installed position. This figure also shows the course traveled by the aspirated air. The air is introduced through the air intake connection 24 to an annular chamber 25 in the adapter 10. From this annular chamber the air flows through baffles 26 into a raw air chamber 27. As a result of the cyclone produced by the baffles 26, heavy dust is separated in this chamber 27. The dust can be carried away through discharge opening 28. The aspirated air flows radially through the filter cartridge 13 from the outside in and then through the safety cartridge 15 from the inside out, and passes through an annular chamber 29 to the filter outlet connection 30.

The safety cartridge 15 is attached by screws through its end plate 31 to a partition 32 in the adapter 10. This end plate 31 also carries a gasket 33. Thus a reliable sealing of the clean air side is assured even when the canister 12 is removed. As shown in this figure, the shoe 17 lies against the contact area 34 on the guide 16. This provides the assurance that in the installed state the canister 12 will be securely and effectively joined to the adapter 10 at the guides. It is important also, in this case, that when the canister 12 is removed or installed, the shoe 17 will rotate about the fulcrum point 35. This means that, when the canister 12 is removed, first the shoe 17 will slide downward on the contact area 34, and not until after the gasket 19 has pulled away from the end plate of the safety cartridge 15 will it be possible for the shoe to slip out of the guide. By situating this fulcrun. point 35 in the sealing plane, the assurance is given that the tilting of the canister 12 will not result in any shearing movement on the gasket 19.

As stated above, it is advantageous to provide two guides and two spacers, so that when the canister 12 is assembled to the adapter 10 better guidance will be assured.

Figure 3:
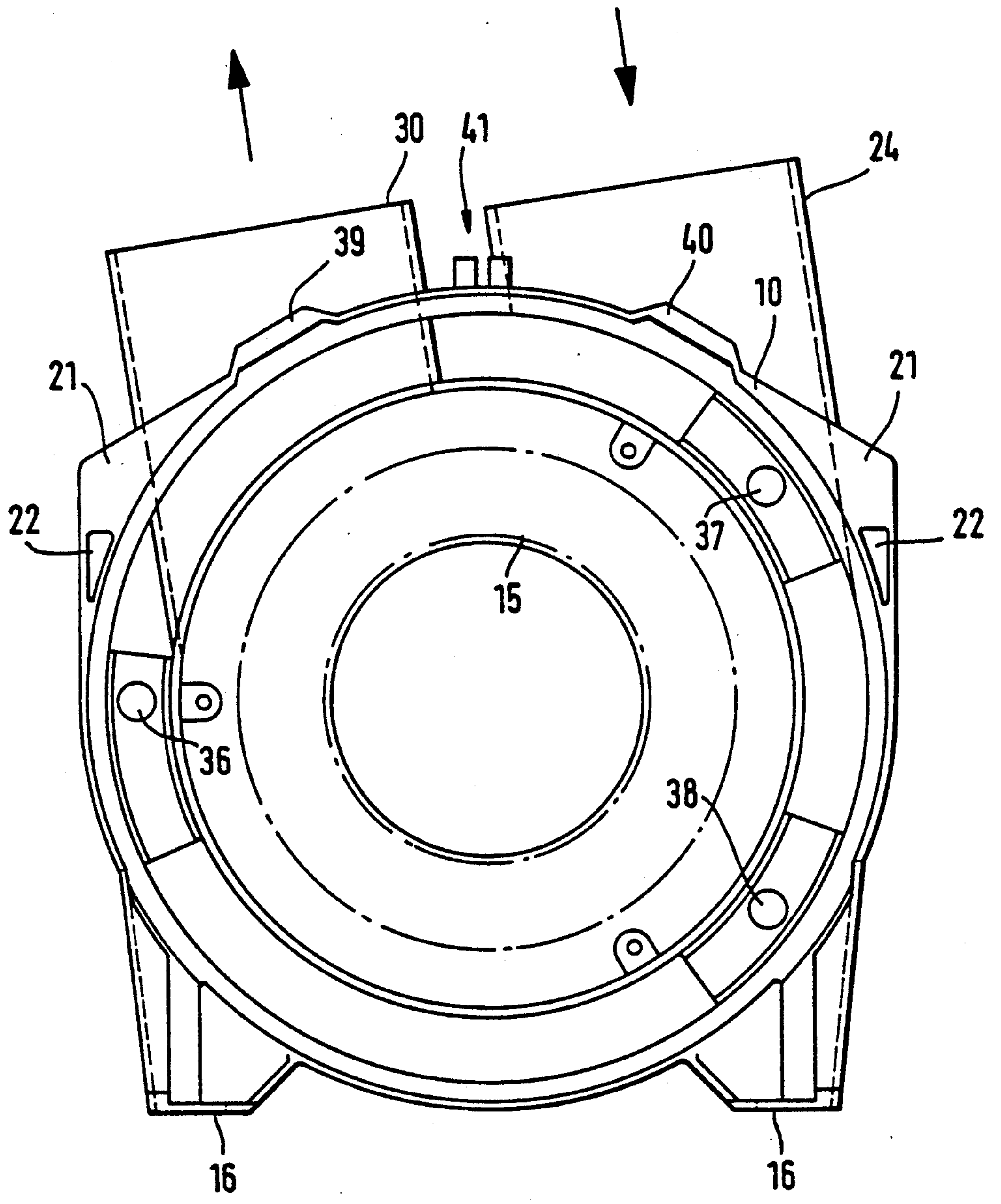
FIG. 3 is a view of the left half of the housing of the air intake filter.

FIG. 3, which is a view of the left half of the filter housing, and therefore of the adapter 10, shows that two guides are arranged at the bottom of adapter 10. Also shown are the abutting surfaces 21 against which the projections 20 (not shown in this figure) engage until they are received in the recesses 22. The arrangement of the guides 16 and of the surfaces 21 in the manner shown illustrates how, as the canister 12 is installed, the projections will reliably cause the canister to tilt back.

The adapter 10 is fastened to the wall on which it is mounted by means of the screws 36, 37 and 38. In this figure the two lugs 39 and 40 can also be seen which are engaged by resilient latches and securely fasten the canister 12 to the adapter 10.

On the top of the adapter 10 are two centering surfaces 41. A projection 42 (shown in FIGS. 1 and 2) on the handle 23 fits between these centering surfaces 41. This additional centering offers further assurance that the canister 12 will be brought to the correct angular position with respect to the adapter 10. At the same time the projection 42 and the centering surfaces 41 constitute a means for visual inspection to determine whether the parts are in correct relation to one another.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all modifications falling within the ambit of the appended claims and equivalents thereof.

What is claimed is:

1. An air intake filter for an internal combustion engine, said filter comprising a filter insert; a canister for receiving said filter insert, said canister having a raw air inlet and an opening for introducing said filter insert into said canister, said filter insert having a first sealing surface parallel to a plane defined by said opening when said filter insert is received in said canister; an adapter having a second sealing surface; means for fastening said canister to said adapter, said second sealing surface being arranged opposite said first sealing surface when said canister containing said filter insert is fastened to said adapter; and a sealing element interposed between said first sealing surface and said second sealing surface; wherein at least one guide is provided on said adapter and at least one sliding shoe is arranged on said canister, said guide and said sliding shoe cooperating with each other to facilitate proper positioning of said canister on said adapter, and wherein at least one spacer is provided on said canister which extends toward said adapter and engages against an abutting surface on said adapter to hold said first and second sealing surfaces apart when they are incorrectly positioned with respect to one another, and a recess is provided on said adapter for receiving each said spacer when said first and second sealing surfaces are correctly positioned with respect to one another, thereby permitting said first and second sealing surfaces to be sealed against one another by means of said sealing element.

2. An air intake filter according to claim 1, wherein said canister has a pot-like configuration, and said filter insert is a filter cartridge having a circumferential surface through which raw air passes to exit as clean air through the interior of said filter cartridge, said filter cartridge having an end face oriented toward said adapter, and said sealing element comprising a sealing ring disposed on said end face of said filter cartridge.

3. An air intake filter according to claim 2, further comprising a plurality of baffles carried by said cartridge, said baffles forming a cyclone for air passing through said filter cartridge.

4. An air intake filter according to claim 2, wherein at least two sliding shoes are provided on said canister and at least two guides are disposed on the adapter adjacent said second sealing surface such that said guides are aligned parallel to said sliding shoes.

5. An air intake filter according to claim 4, wherein two spacers are provided on said canister, and an abutting surface and a receiving recess are provided on said adapter for each of said two spacers.

6. An air intake filter according to claim 5, wherein said abutting surfaces are disposed radially outward of said second sealing surface, and said spacers are arranged on an opposite side of said canister from said guides and sliding shoes.

7. An air intake filter according to claim 1, wherein a handle is provided on said canister.

8. An air intake filter according to claim 7, wherein a centering projection is provided on said canister, and a centering surface is provided on said adapter, said centering projection cooperating with said centering surface to facilitate proper positioning of said canister for attachment to said adapter.

9. An air intake filter according to claim 1, further comprising a safety filter cartridge disposed in said adapter.

10. An air intake filter according to claim 9, wherein said second sealing surface is formed by an annular end plate on said safety filter cartridge.

11. An air intake filter according to claim 1, wherein when said first and second sealing surfaces are correctly positioned with respect to one another, said sliding shoe is supported against said guide such that the guide and sliding shoe serve to fasten the canister to the adapter.

12. An air intake filter according to claim 11, further comprising at least one additional means for fastening said canister to said adapter.

13. An air intake filter according to claim 12, wherein said additional fastening means is a resilient latch.

* * * * *